(12) United States Patent
Krumbeck et al.

(10) Patent No.: US 6,374,957 B1
(45) Date of Patent: Apr. 23, 2002

(54) BRAKE CYLINDER FOR A RIM BRAKE (75) Inventors: Markus Krumbeck; Stefan Ruckh, both of Bad Urach; Joachim Hujer, Bad Ditzenbach; Ludwig Rottenkolber, Bad Urach, all of (DE)

(73) Assignee: Gustav Magenwirth GmbH & Co. (DE)

( * ) Notice: Subject to any disclaimer, the term of this patent is extended or adjusted under 35 U.S.C. 154(b) by 0 days.

(21) Appl. No.: 09/617,289

(22) Filed: Jul. 14, 2000

Related U.S. Application Data (63) Continuation of application No. PCT/EP99/09701, filed on Dec. 9, 1999.

(30) Foreign Application Priority Data

Dec. 9, 1998 (DE) .......................................... 198 56 804
Jun. 28, 1999 (DE) .......................................... 199 29 678

(51) Int. Cl.⁷ .................................................. B62L 1/06
(52) U.S. Cl. ................................ 188/24.19; 188/24.12; 188/71.7; 188/344
(58) Field of Search ............................. 188/344, 24.11, 188/24.12, 24.22, 24.19, 345, 71.7, 71.9, 72.4

(56) References Cited

U.S. PATENT DOCUMENTS

| | | | | |
|---|---|---|---|---|
| 3,776,333 A | * | 12/1973 | Mathauser | 188/344 |
| 4,391,353 A | * | 7/1983 | Mathauser | 188/24.12 |
| 4,585,094 A | * | 4/1986 | Rottenkolber et al. | 188/24.22 |
| 4,632,225 A | * | 12/1986 | Mathuaser | 188/24.18 |
| 4,896,753 A | * | 1/1990 | Sule | 188/344 |
| 5,249,646 A | * | 10/1993 | Thiel | 188/71.9 |
| 5,358,078 A | | 10/1994 | Gajek et al. | 188/72.4 |
| 5,813,501 A | * | 9/1998 | Terry, Sr. | 188/344 |

* cited by examiner

Primary Examiner—Christopher P. Schwartz
Assistant Examiner—Mariano Sy
(74) Attorney, Agent, or Firm—Pillsbury Winthrop LLP

(57) ABSTRACT

The invention relates to a brake cylinder (100) and a hydraulic rim brake comprising a unit for receiving a brake pad (103). With known brake cylinders, it is difficult to remove the running wheel if the tire mounted on the wheel rim (6) is substantially wider than the wheel rim (6), since the wheel has to be moved through the gap between the two brake pads arranged on the brake cylinder. The brake cylinder according to the invention should have a simple structure and permit easy removal of the running wheel. The brake cylinder (100) according to the invention has a connecting member (302) for the arrangement of the brake cylinder (100) on a frame part (2") in a manner rotatable about an axis, the axis being essentially orthogonal to the receiving unit for the brake pad (103).

9 Claims, 5 Drawing Sheets

BRAKE CYLINDER FOR A RIM BRAKE

This application is a continuation of PCT/EP99/09701 filed Dec. 9, 1999.

The invention relates to a brake cylinder for a rim brake and a rim brake comprising such brake cylinders. In particular, the invention relates to a brake cylinder for a hydraulic rim brake for bicycles and a hydraulic rim brake.

A brake cylinder is disclosed in DE 42 32 598 C2.

In the case of the rim brake shown in DE 42 32 598 C2 and comprising the brake cylinders disclosed there, it is difficult to remove the running wheel if the tire mounted on the wheel rim is significantly wider than the wheel rim since the tire has to be moved through the gap between the two brake pads which are arranged on the brake cylinders. Particularly difficult is the removal of the running wheel with the use of the thick tires employed, for example, in mountain bikes.

It is therefore the object of the invention to provide a brake cylinder for a rim brake, or a rim brake, which cylinder or which brake permits easy removal of the running wheel with a simple design of the rim brake.

The object is achieved by a brake cylinder having the features of the embodiments of the invention described herein.

In association with this invention, the direction of the unit for receiving a brake pad denotes a direction tangential to the rim, based on a rim region in which the brake pad makes contact with the rim. This direction is equivalent to the running direction of the rim at the point where the brake pad makes contact with the rim.

In association with this invention, the direction of the main axis of the brake cylinder denotes a direction in which the brake pad is moved toward the rim or away from the rim. As a rule, the brake is operated by displacing a piston in the brake cylinder along the main axis of the brake cylinder.

The design, according to the invention, of the brake cylinder has the advantage that, owing to the rotatable arrangement of the brake cylinder or cylinders, the running wheel can be easily and rapidly removed and reinstalled.

In addition, the brake cylinder according to the invention has the advantage that there is no need for a complicated readjustment of the brake cylinders relative to the rim since the rotation of the brake cylinders returns the brake cylinders to the old setting after reinstallation of the running wheel. This is the case in particular because the brake cylinders need not be detached from the frame for removing the running wheel or defined guidance of the brake cylinders during the rotational movement is ensured. To this extent, the brake cylinder can always be returned to exactly the same starting position after each rotational movement.

A known solution for fastening a brake cylinder of a hydraulic rim brake to frame parts of a bicycle is a two-part adapter comprising a clip-like receiver for the brake cylinder. The adapter is fastened on a cantilever brake base. Degrees of freedom of the orientation of the brake cylinder in all directions for the adjustment of the rim brake are ensured by a spherical receiver.

The known solution has the disadvantages that complicated, expensive parts are used. The parts are moreover heavy and large. The number of parts is large. The mounting of the rim brake requires complicated adjustment work. The complicated adjustment work is also required when reinstalling the running wheel.

The invention provides a brake cylinder or a rim brake, which brake cylinder or which rim brake has at least one feature or any combination of the following features:

1) The brake cylinder is rotatably mounted on the bicycle front fork or on the bicycle rear structure.
2) The axis of rotation is substantially parallel to the fork tube or the seat stay.
3) The rotation is performed about the longitudinal axis of the fork tube or of the seat stay.
4) The axis of rotation is essentially perpendicular to the brake pad.
5) The axis of rotation is inside the brake cylinder. This has the advantage that a very compact design of the brake cylinder can be realized.
6) The axis of rotation is outside the brake cylinder. This has the advantage that the construction of a specific version is simpler because collisions of components during the rotational movement of the brake cylinder can be more easily avoided.
7) When viewed in the direction of travel, the brake cylinder is mounted in front of the supporting part.
8) The brake cylinder offers resistance to the pressures and main braking forces in the force flux in an interlocking manner.
9) The swivelling out of one or both brake cylinders ensures rapid removal of the running wheel.
10) The braking forces in the reverse direction are resisted via a detachable locking means.
11) The rotary means is formed in such a way that defined guidance of the brake cylinder during the rotational movement is ensured. To this extent, the brake cylinders can always be returned to exactly the same starting position after every rotational movement.
12) The degrees of freedom in assembly are limited to an expedient range.

The invention has in particular the following advantages:

Both the brake cylinder and the rim brake as a whole are easily assembled and have few parts.

Furthermore, manufacture is economical and a small construction space is required.

The construction according to the invention leads to a low weight.

The brake cylinder and its fastening can be well integrated visually.

The mounting and removal of the running wheel are rapid and simple.

The brake pad need not be readjusted when the running wheel is reinstalled but is retained.

The mounting of the rim brake or of the brake cylinder is effected in a simple, rapid and unique manner. There is no need for complicated adjustment.

To adjust the position of the free end of the piston inside the cylinder relative to the brake cylinder and hence relative to the rim, it is known that, in the case of rim brakes, hydraulic fluid can be introduced into the pressure space of the brake cylinder by means of a screw on the master cylinder. During this procedure, the piston moves against the action of a spring arrangement in the direction of the rim. By loosening the screw on the master cylinder, hydraulic fluid is withdrawn from the pressure space. Consequently, the piston moves back away from the rim through the force of the spring means.

The free end of the piston is to be understood as meaning that end of the piston which is opposite to the rim of the bicycle in the case of a brake cylinder mounted on a bicycle and, when the brake cylinder is actuated, causes a brake pad to move toward the rim.

In the case of a hydraulic rim brake, usually two brake cylinders are connected to one another by a hydraulic line in such a way that, by operating the brake lever, both brake cylinders are actuated identically and the respective pistons emerge to equal extents from the cylinders. Accordingly, the adjustment of the adjusting screw on the master cylinder results in the simultaneous adjustment of the rest position of the pistons of both brake cylinders. However, there is a need to adjust the setting of the rest position for optimal adaptation of the brake to the rim individually for each brake cylinder.

For example, in the case of disk brakes, it is known that an open system can be used instead of a closed system. An open system means a system comprising a compensating tank which, in the rest position of the brake lever, is connected to the pressure space of the calliper. If the volume of the pressure space is changed by adjustment of the piston in the calliper, a corresponding compensation with hydraulic fluid can be effected by the compensating tank. When the brake is operated, the pressure space is disconnected from the compensating tank. However, an open system has the disadvantage that, owing to the necessity of a compensating tank, it is relatively complicated and hence expensive to manufacture. Consequently, closed systems without a compensating tank are usually used in the case of hydraulic rim brakes.

To be able to adjust the relative position of the free end of the piston with respect to the cylinder independently of the other brake cylinder, the brake cylinder according to the invention preferably has an adjusting device by means of which the relative position of the free end of the piston is adjustable in the axial direction in the cylinder in such a way that the volume of the pressure space remains essentially unchanged. This has the advantage that there is no exchange of hydraulic fluid with the system on adjustment of the free end of the piston in the axial direction relative to the cylinder. Consequently, the adjustment of the free end of the piston can be effected independently of a compensating tank in the case of an individual brake cylinder.

For example, the adjustment of the relative position of the free end of the piston with respect to the cylinder can be effected by means of an adjusting piston which moves the piston (and hence also the free end of the piston) together with the pressure space in the cylinder in the axial direction. As a result, the relative position of the free end of the piston with respect to the cylinder is changed, the volume of the pressure space simultaneously remaining unchanged.

Advantageously, the adjusting piston is screwed into a region of the cylinder. This has the advantage that the adjustment of the free end of the piston can be carried out exactly and reliably.

Advantageously, the distance between the inflow into the pressure space and the adjusting piston in a position furthest away from the inflow is greater than the maximum possible adjustment distance of the adjusting piston. As a result, the possible exchange of hydraulic fluid between the inflow and the pressure space is ensured at all times.

Advantageously, the adjusting piston has a securing ring which limits the maximum possible adjustment distance of the adjusting piston.

For example, the adjustment of the relative position of the free end of the piston with respect to the cylinder can be effected, according to a further embodiment of the invention, by making the piston adjustable in length. This has the advantage that position and size of the pressure space need not be changed during the adjustment of the distance between the free end of the piston and the rim because the relative distance between the free end of the piston and the rim or brake pad and rim can be adjusted merely by adjusting the length of the piston.

A further development of the present invention with one of the devices described for adjustment of the relative position of the free end of the piston with respect to the cylinder results in the further advantage that the brake pad adjustment can be made particularly simply and independently of the adjustment of the brake cylinder. In particular, the distance of the free end of the piston or of the brake pad from the rim of the bicycle can be roughly predetermined by the formation, according to the invention, of the rotatable fastening means and can be finely adjusted by the individual adjustment of the relative position of the free end of the piston with respect to the cylinder of the brake cylinder. This further development results overall in a simple design of the brake cylinder with few parts. In particular, the brake cylinder can be mounted exactly, simply and rapidly on the bicycle.

The further development of the present invention with one of the devices described for adjusting the relative position of the free end of the piston with respect to the cylinder furthermore results in the advantage that the position of the brake pad can be separately set axially and can be adjusted when the pad wears.

According to one embodiment of the present invention, the arrangement member on the rear structure of the frame or the fork with respect to the rim is arranged in such a way that, when the brake cylinder is installed on the arrangement member and when the brake cylinder is rotated to the braking position, the correct position between the brake pad and the rim is automatically established.

The invention is described below by way of example with reference to the embodiments shown in the Figures.

Figure 1:
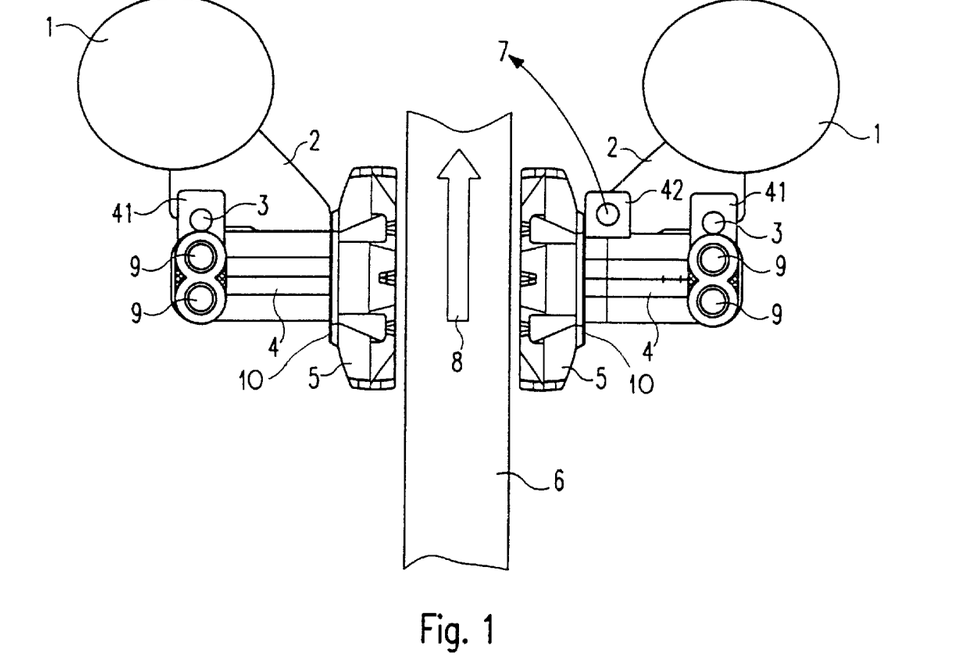
FIG. 1 shows a first embodiment of a rim brake according to the present invention, comprising brake cylinders according to the invention in a braking position.

FIG. 1 shows a first embodiment of a rim brake according to the present invention comprising brake cylinders according to the invention in a braking position. Braking position means a position in which the brakes can be operated. The embodiment shown in FIG. 1 is suitable for mounting the rim brake both on the front wheel fork and on the rear structure of the frame.

Two brake cylinders 4 are arranged on two frame parts 1 of a bicycle which is not shown. The frame parts are either the fork legs of the front wheel fork or the stays of the frame rear structure. A running wheel, i.e. the front wheel or rear wheel, is arranged between the frame parts 1. For the sake of clarity, a part of the wheel rim 6 on which the tire, which is not shown, is usually mounted is shown only schematically.

A transmitter fitting which is not shown and which is connected in a known manner via hydraulic lines 9 to the brake cylinders 4 is mounted on a handlebar which is not shown. When the hand lever of the transmitter fitting is operated, a hydraulic pressure is built up in the hydraulic lines and actuates the brake cylinder, which in turn presses the brake pads 5 arranged thereon in a receiving unit 10 against the rim 6.

In each case an arrangement member 2 is mounted on the frame parts 1. In the embodiment shown, the arrangement member 2 is in the form of a plate. Preferably, the arrangement members 2 are each formed as a single piece with the associated frame part 1. Preferably, the arrangement members are formed in such a way that the brake cylinder is adjusted sufficiently accurately for braking operations by its fastening or arrangement on the arrangement member.

In each case a brake cylinder 4 is rotatably arranged on the arrangement members. The brake cylinders 4 have a connecting member 41 on their ends facing away in each case from the rim. In the embodiment shown, the connecting members 41 are appendages having orifices which receive bolts 3, each of which engage in an arrangement member 2. Those appendages of the brake cylinders 4 which receive the bolts 3 are preferably each formed as a single piece with the associated brake cylinder 4.

The brake cylinders 4 are hinged to the frame parts 1 via the bolts 3 in such a way that the brake cylinders 4 are each rotatable about the axis of the bolts 3. This axis of rotation is essentially perpendicular to the running direction of the rim at the point at which the brake pads make contact with the rim on braking. In other words, the axis of rotation is essentially perpendicular to the brake pads or the receiving unit. The defined guidance of the pivot means permits the repositioning of the brake cylinders even in the case of repeated rotational movements which are required, for example, during installation or removal of the wheel.

The possible rotation range of the brake cylinder 4 is limited by the arrangement member 2. When the brake is operated, forces are transmitted from the rim 6 to the brake pads 5 and from the brake pads 5 to the brake cylinders 4, the direction of which forces corresponds to the running direction 8 of the running wheel at the point at which the brake pads 5 make contact with the rim 6. Relative to the axes of rotation which are defined by the bolt 3, these forces exert a torque on each of the brake cylinders 4, which torque turns the respective brake cylinder 4 in the direction of the associated arrangement member 2, i.e. the brake cylinder shown on the left in FIG. 1 in the counterclockwise direction and the brake cylinder shown on the right in FIG. 1 in the clockwise direction. The brake cylinders 4 are held in an interlocking manner by the arrangement members 2. Consequently, the force is transmitted from the brake cylinders 4 to the arrangement members and from the arrangement members to the frame parts.

According to one embodiment of the invention, the brake cylinders are arranged on the arrangement members so as to be rotatable about an axis of rotation, in such a way that the force exerted by the brake pad on the brake cylinder during braking is directed from the center of the contact region between brake pad and rim approximately and preferably exactly toward the tube center of the frame part on which the brake cylinder is arranged. This has the advantage that only a small torque or no torque is exerted on the frame part, which torque would cause the frame part to rotate. The force exerted by the brake pad on the brake cylinder during braking is the sum of the force which is exerted by the rim via the brake pad on the brake cylinder and which is directed parallel to the direction 8 of movement of the rim and the opposite force which is exerted by the rim on the brake pad during braking and which is directed perpendicularly to the direction 8 of movement of the rim and away from the rim. The axis of rotation is arranged in such a way that the force exerted by the brake pad on the brake cylinder during braking exerts on the brake cylinder a torque in such a way that the brake cylinder is rotated into the braking position in which it rests in an interlocking manner against the arrangement member.

The arrangement member 2 designed as a plate forms a pivot. The pivot can be provided as a pin formed as a single piece with the arrangement member or can be in the form of a bolt 3. The pivot serves for receiving the brake cylinder 4. The force of reaction is taken up by the arrangement member in an interlocking manner in the axial and tangential direction.

In the brake cylinder 4 shown on the right in FIG. 1, a locking member 42 is furthermore provided. The locking member is preferably formed as a single piece with the brake cylinder 4. A bolt 7 in the form of a detachable securing element is held in an orifice of the locking member 42. The bolt can be kept under initial tension in a locked position, for example by a spring. In the locked position, the bolt 7 interlocks the brake cylinder 4 with the arrangement member 2. Consequently, the brake cylinder is fixed with two axes relative to the arrangement member and a rotation about the axis of rotation defined by the bolt 3 is prevented. Particularly during reverse travel, the rotation of the brake cylinder about the axis of rotation defined by the bolt 3 is prevented by the detachable securing element.

Figure 2:
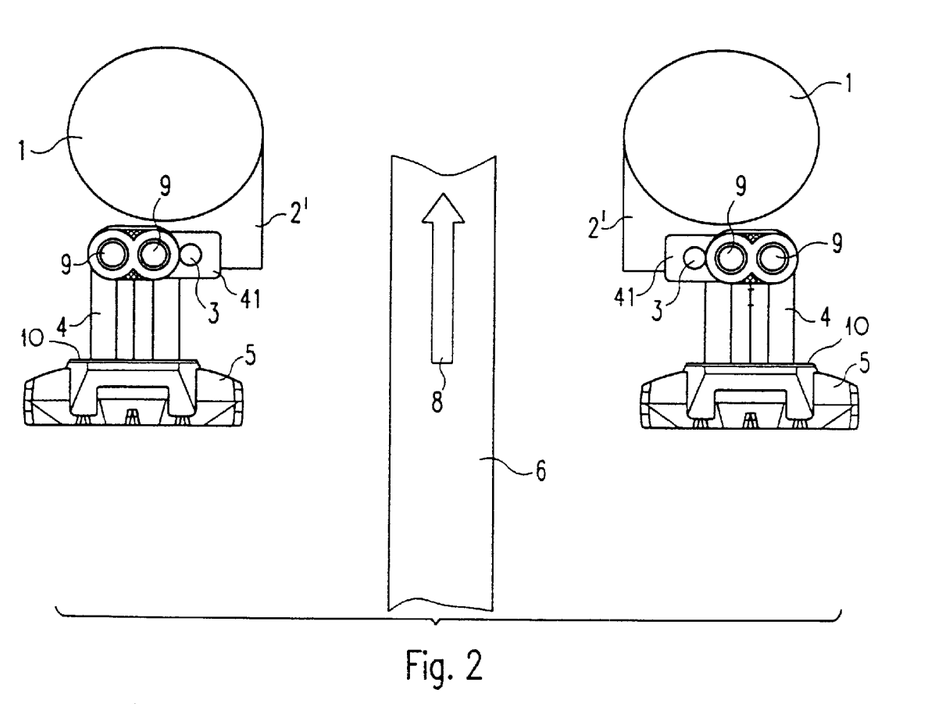
FIG. 2 shows a second embodiment of a rim brake according to the invention, comprising brake cylinders according to the invention in a mounting position.

For removing the running wheel, the bolt 7 is detachably arranged so that the brake cylinder 4 can be swivelled into the position shown in FIG. 2 in the case of the other embodiment of the invention.

In an embodiment of the invention which is not shown, a pretensioning member causes the brake cylinder 4 to be pretensioned in the braking position relative to the arrangement member 2. As a result of this, the brake cylinder turns back automatically, for example from the mounting position into the braking position. Moreover, during forward travel, it is ensured that the brake cylinders are always arranged in the braking position.

FIG. 2 shows a second embodiment of a rim brake according to the present invention, comprising brake cylinders according to the invention in a mounting position. Mounting position means a position in which the wheel can be mounted and removed.

The embodiment shown in FIG. 2 is suitable for mounting the rim brake both on the rear structure of the frame and on the fork holding the front wheel.

The embodiment of FIG. 2 differs from the embodiment of FIG. 1 essentially in the formation of the arrangement member 2 or 2'. The other identical parts have the same reference numerals as the embodiment of FIG. 1.

In the mounting position, the two brake cylinders 4 are shown swivelled out of the braking position by 90°. Consequently, the brake pads 5 do not hinder the mounting and removal of the running wheel.

For mounting a brake cylinder 4 on a frame part 1, the brake cylinder 4 is simply rotatably connected by its connecting part 41 via the bolt 3 to the arrangement member 2 of the frame part 1. In the embodiment comprising the detachable securing element, the bolt 7 is then inserted into the locking member 42 and connected to the arrangement member.

FIGS. 3 to 6 show the preferred embodiment of the invention.

Figure 3:
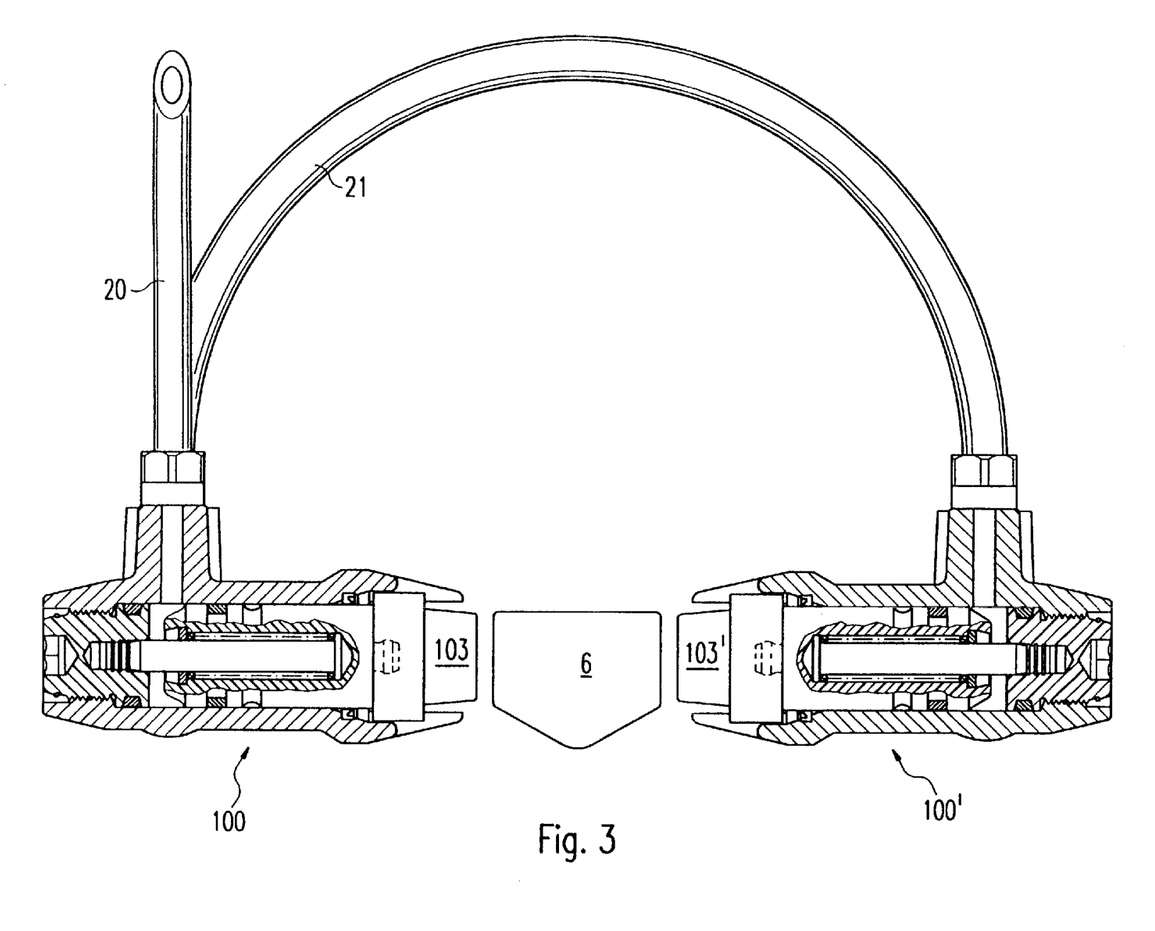
FIG. 3 shows the preferred embodiment of a rim brake according to the present invention comprising brake cylinders according to the invention which are shown partly in cross-section.

FIG. 3 shows a rim brake according to the present invention, comprising brake cylinders 100, 100' according to the invention, which are arranged on both sides of a rim 6. The brake cylinders 100, 100' symmetrical with respect to one another are described in more detail with reference to the brake cylinder 100 shown on the left, in association with FIG. 4. For operating the brake, hydraulic fluid is fed into the left brake cylinder 100 via a tube 20. At the same time, hydraulic fluid is fed in via a second connection which is not shown and leads to the pressure space 106 and via a connecting tube 21 to the right brake cylinder 100'. The hydraulic fluid is fed in by a known manner by means of a brake lever which actuates a master cylinder which forces hydraulic fluid into the tube 20.

Figure 4:
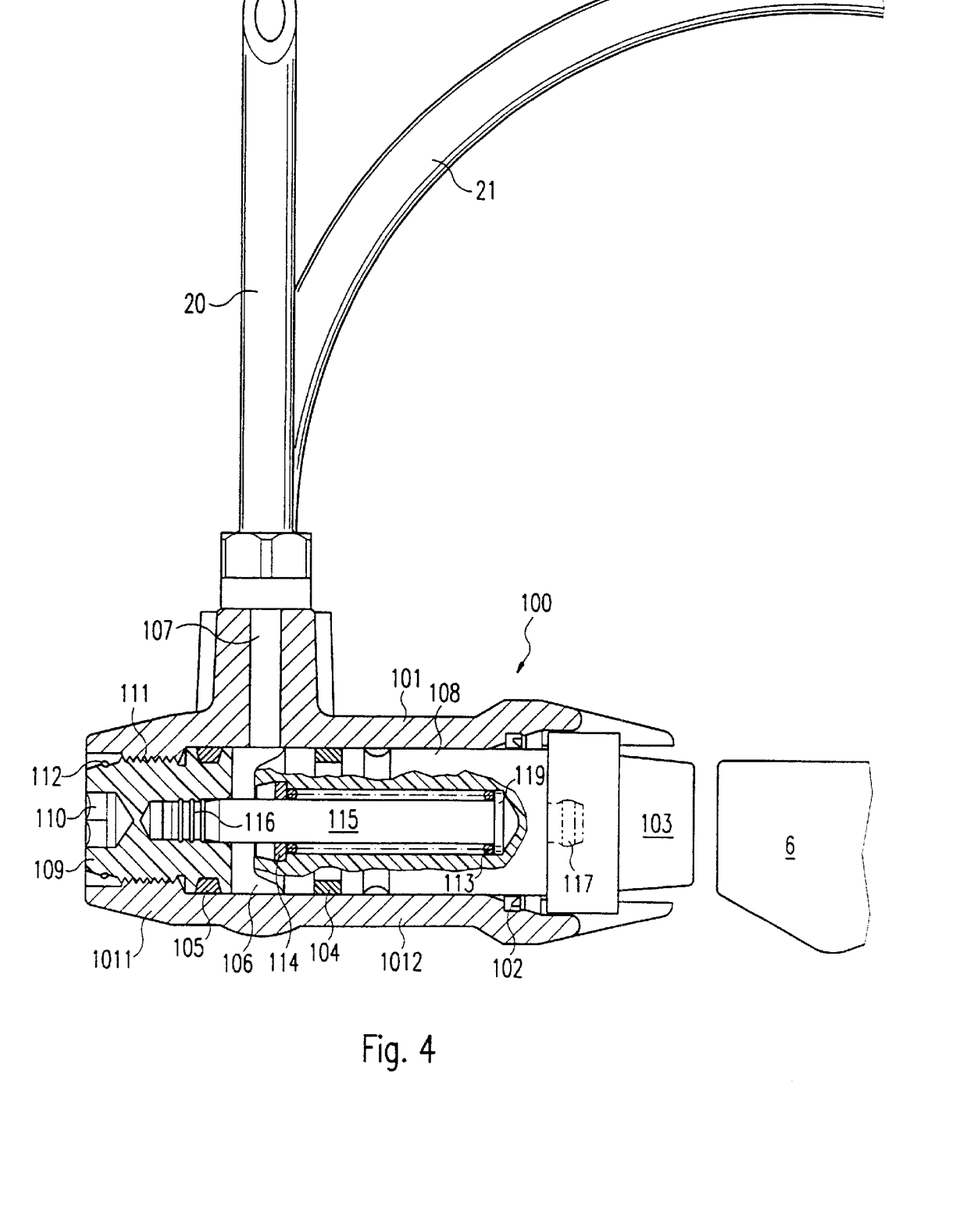
FIG. 4 shows a brake cylinder of FIG. 3 on a larger scale.

FIG. 4 shows the left brake cylinder 100 of FIG. 3 on a larger scale. The brake cylinder 100 comprises a cylinder 101 having a through-hole whose diameter in a first section 1011 is smaller than in a second section 1012. The first section 1011 has an internal thread. From left to right, an adjusting piston 109, a pressure space 106 and a piston 108 are arranged in the inner hole of the cylinder 101.

The adjusting piston 109 has, on the left side, a section of smaller diameter which is provided with an external thread 111, and a second section which is arranged on the right of the first section in FIG. 4 and has a larger diameter and in which a groove is provided for a seal 105 which seals the pressure space 106. The adjusting piston 109 is screwed by means of the external thread 111 into the internal thread of the cylinder 101. A hexagon socket 110 is provided in the end face of the adjusting piston 109 for turning the adjusting piston 109. The securing ring 112 limits the possible adjustment distance of the adjusting piston 109 in the inner hole in that it abuts the internal thread in the section 1011 of the cylinder 101 at the maximum possible adjustment. Arranged to the right of the adjusting piston is the pressure space 106, which is filled with hydraulic fluid during operation. The pressure space 106 is connected to the tube 20 via an inflow 107. The piston 108 is arranged to the right of the pressure space 106. The piston 108 has an all-round groove for a seal 104 for sealing the pressure space 106. The piston 108 furthermore has an inner hole which holds the bolt 115 and the spring 113. The spring 113 is supported on the left by a washer 114 which, in a first section of the hole which has a larger diameter, is inserted into the piston 108 and caulked. The washer 114 can alternatively or additionally be fixed by other conventional securing components, such as, for example, a circlip. On the right side, the spring 113 is supported on a head 119 of the bolt 115. The bolt 115 is fastened in the adjusting piston 109 by means of a press fit 116. Alternatively or additionally, the bolt 115 could also be fastened in the adjusting piston 109 by an adhesive bond, solder joint or thread connection.

The piston has a fastening head 117 on which the brake pad 103 is fastened. To prevent dirt from entering the cylinder 101, a wiper 102 is provided in the region of the orifice of the cylinder 101.

When the brake lever, which is not shown, is operated, a piston in a master cylinder not shown is actuated and forces the hydraulic fluid into the tube 20. Consequently, hydraulic fluid is introduced via the inflow 107 into the pressure space 106. As a result of this pressure increase, the piston 108 moves to the right in the cylinder 101, against the action of the spring 113, so that the pad 103 rests against the rim 6 and a braking effect can be produced. Correspondingly, hydraulic fluid is fed to the brake cylinder 100' via the connecting tube 21 and correspondingly actuates the piston of this brake cylinder. If the pressure of the hydraulic fluid declines as a result of releasing the brake lever, the piston 108 is pushed back by the spring 113 back to the starting position, and the hydraulic fluid is forced back into the tube 20.

For an optimum braking effect, it is necessary to set the distance between the brake pad 103 and the rim 6. For example, when the brake pad 103 wears, it is necessary to move the starting position of the piston 108 to the right. In the brake cylinder according to the invention, this can be simply done by turning the adjusting piston 109 via the thread 111 in the inner hole of the cylinder 101 and hence moving it in the axial direction. The adjusting piston 109 moves the piston 108 to the right, in particular by means of the bolt 115. The tension of the spring 113 does not change. In principle, all parts in the inner hole in the cylinder 101 are moved in the axial direction, relative to the cylinder 101.

To ensure reliable operation of the brake at all times, it is important that the adjustment is not made to such an extent that the adjusting piston 109 blocks the inflow 107 into the pressure space 106. This is why the securing ring 112 is arranged in such a way that it limits the possibility of adjustment of the adjusting piston 109 in such a way that it is always arranged to the left of the inflow 107.

Figure 5:
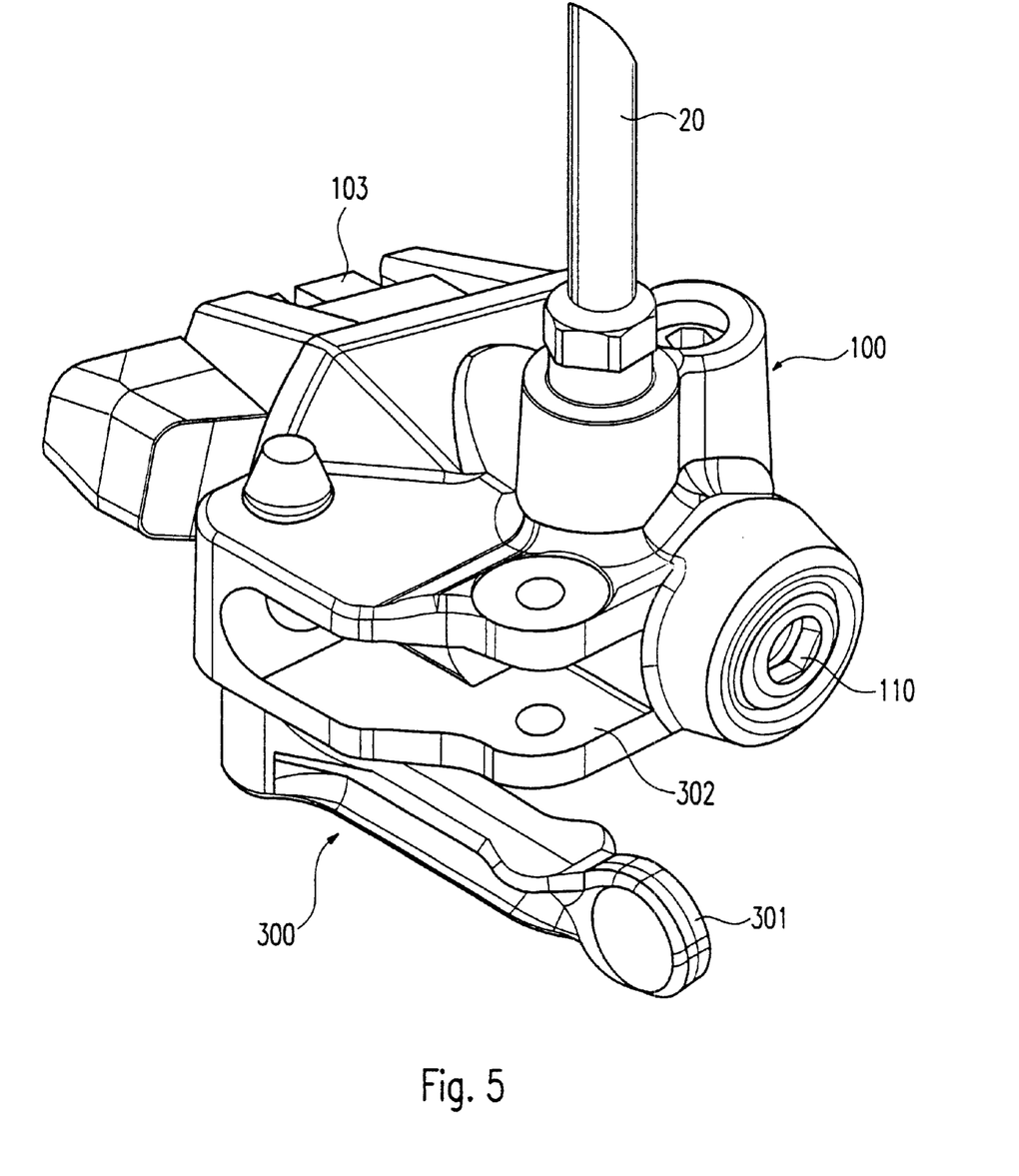
FIG. 5 shows a perspective view of the brake cylinder of FIG. 3.

FIG. 5 shows a perspective view of the brake cylinder 100 of FIGS. 3 and 4. The perspective view shows the preferred fastening device 300 according to the invention for the brake cylinder. The brake cylinder can be rotatably fastened to a frame part by means of the appendages 302, by a bolt not shown in FIG. 5. To be able to perform the rotational movement rapidly, a fast-action locking lever 301 is provided.

Figure 6:
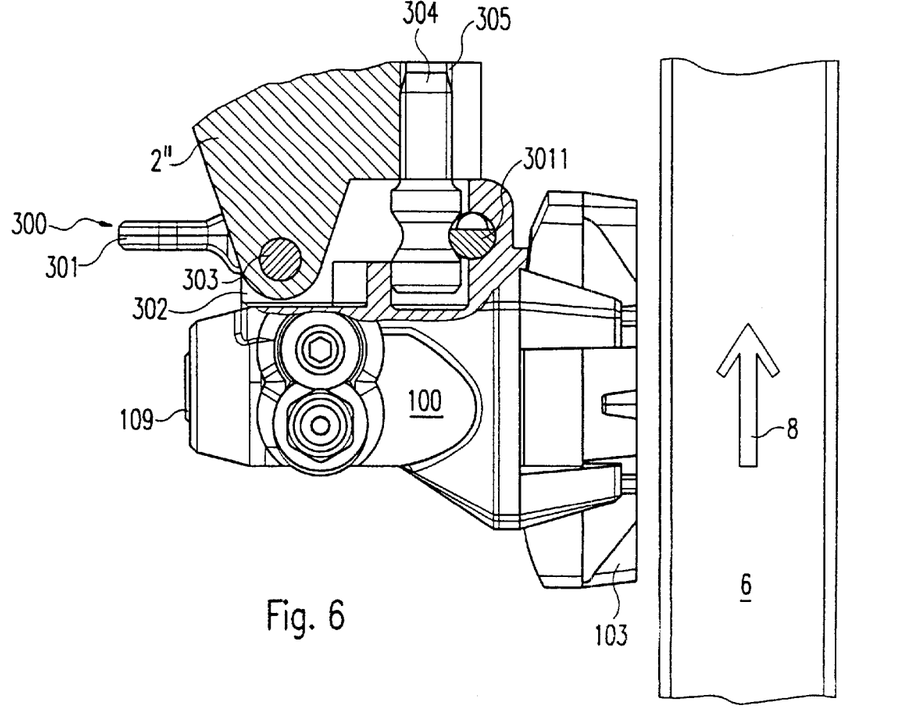
FIG. 6 shows a view of the brake cylinder of FIG. 3 from above, cut away in the region of the fastening device.

FIG. 6 shows a view of the brake cylinder 100 of FIGS. 3 to 5 from above, which view is cut away in the region of the fastening arrangement 300. On the basis of this diagram, the preferred fastening device 300 according to the invention can be very well described.

FIG. 6 shows the fastening device only for the brake cylinder 100 shown on the left of FIG. 3, i.e. the brake cylinder on the left in the direction of travel of the bicycle. The fastening device 300 for the other brake cylinder is designed in a corresponding manner, i.e. is a mirror image.

The arrangement member 2" is arranged on the rear structure of the bicycle or on the fork of the bicycle. The brake cylinder 100 is rotatably arranged on the arrangement member 2", via the bolt 303. The bolt 303 engages both an orifice of the arrangement member 2" and an orifice of the connecting member 302. An eccentric locking pin 3011, which is connected to a fast-action locking lever 301, is provided for stopping the rotational movement about the axis determined by the bolt 303. The eccentric fast-action locking pin 3011 cooperates with a screw 304 which is screwed into a threaded hole 305 formed in the arrangement member 2". The initial tension produced by the cooperation of the eccentric locking pin with the head of the screw 305, provided with a recess, can be preset by means of the screw 304.

FIG. 6 shows the brake cylinder 100 in a position in which the rotational movement is stopped. By moving the locking lever 301 into a position parallel to the rim 6, the eccentric locking pin 3011 releases the head of the screw 304 so that the brake cylinder 100 can be rotated, about the axis determined by the bolt 303, into the mounting position.

The fastening device 300 shown in FIG. 6 represents a particularly simple and reliable means of fastening the brake cylinder 100 on the arrangement member 2" and for stopping the rotational movement about the axis determined by the bolt 303. In particular, releasable locking between the brake cylinder 100 and the arrangement member 2" is provided.

In a further embodiment not shown, the brake cylinder is not, as shown in FIG. 6, arranged before the frame part and the arrangement member 2", when viewed in the running direction 8 of the rim 6, but behind the arrangement member and the frame part, when viewed in the running direction of the rim. This embodiment is suitable in particular for applications where the space in the knee region between frame and fork is limited. The embodiment corresponds to that shown in FIG. 6, but the running direction 8 is in the other direction. This embodiment, too, provides an integrated solution and a defined rotational movement of the brake cylinder into the braking position. In this embodiment, owing to the changed force distribution during braking, the eccentric locking pin must be suitably dimensioned in order to be able to absorb the forces occurring during braking.

Figure 7:
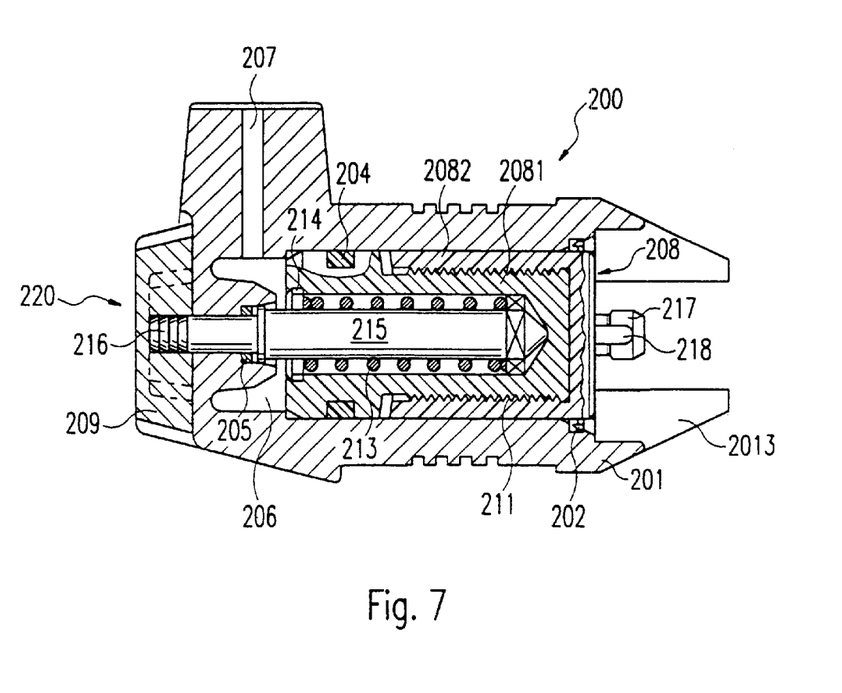
FIG. 7 shows a cross-section of a brake cylinder according to a further embodiment of the present invention.

FIG. 7 shows a section through a further embodiment of a brake cylinder according to the invention. The brake cylinder comprises a cylinder 201 having a hole in which a piston 208 is displaceably arranged. Provided to the left of the piston 208 is a pressure space 206 which is connected via an inflow 207 to a tube 20 which is not shown and which is connected to the master cylinder, which is not shown. The piston 208 comprises a piston inner part 2081 and a piston outer part 2082. The piston outer part 2082 has a hole with an internal thread. The piston inner part 2081 has an external thread 211 which engages the internal thread of the piston outer part 2082. By turning the piston inner part 2081 relative to the piston outer part 2082, it is thus possible to change the length of the piston 208. The piston inner part 2081 has a noncircular inner hole in which a bolt 215 having a head is nonrotatably arranged. The head has a cross-section corresponding to the cross-section of the hole. In the embodiment shown, the cross-section of the piston inner part is hexagonal and the head of the bolt is a conventional hexagon. The spring 213 is supported on the head of the bolt 215. On that side of the piston inner part 2081 which is adjacent to the pressure space 206, the piston inner part 2081 has a short larger hole into which a washer 214 is inserted and caulked. The washer 214 can alternatively or additionally be fastened by other conventional securing components, such as, for example, a circlip. The spring 213 is supported on the washer 214. The bolt passes through an orifice in the right wall of the brake cylinder 200, which wall terminates the pressure space 206. The seal 205 seals the pressure space 206 from the surroundings. The piston inner part 2081 has a groove in which the seal 204 for sealing the pressure space 206 is arranged. To avoid soiling of the interior of the cylinder 201, a wiper 202 is provided on the orifice of the cylinder 201.

An adjusting wheel 209 of an adjusting device 220 is nonrotatably fastened on the bolt 215 by means of a press fit 216 and thus nonrotatably connected to the piston inner part 2081. Alternatively or additionally, the bolt 215 could be connected to the adjusting wheel 209 also by means of an adhesive bond, solder joint or threaded connection. The piston outer part 2082 has a fastening head 217 for fastening the brake pad, which is not shown. The outer ends of the brake pad engage extensions 2013 of the brake cylinder. The brake pad is thus arranged nonrotatably relative to the brake cylinder 200. The fastening head 217 has a surface 218 which prevents the piston outer part 2082 from rotating relative to the brake pad d hence relative to the cylinder 201. By turning the adjusting wheel 209, it is thus possible to turn the piston inner part 2081, which is connected nonrotatably to the adjusting wheel, relative to the piston outer part 2082, which is arranged essentially nonrotatably with respect to the brake cylinder 200. As a result, the length of the piston 208 and the distance of the brake pad from the rim change. Since the position of the piston 208 relative to the pressure space 206 does not change, the volume of the pressure space 206 remains unchanged.

The invention therefore also relates to a brake cylinder for a hydraulic rim brake, comprising a pressure space and a cylinder in which a piston is displaceably arranged, the pressure space being displaceable together with the piston.

The invention therefore also relates to a brake cylinder for a hydraulic rim brake or disk brake, comprising a cylinder in which a piston is displaceably arranged, the length of the piston being adjustable.

The invention therefore also relates to a brake cylinder for a hydraulic brake, comprising a cylinder, in which a piston is arranged so as to be displaceable in the axial direction of the cylinder, a pressure space, the piston being displaceable in the cylinder by changing the volume of the pressure space, and an adjusting device by means of which the relative position of the free end of the piston is adjustable in the axial direction relative to the cylinder in such a way that the volume of the pressure space remains essentially unchanged.

The invention therefore also relates to a brake cylinder described above, in which the piston can be moved together with the pressure space in the axial direction in the cylinder by operating an adjusting means.

The invention therefore also relates to a brake cylinder described above, in which the adjusting device comprises an adjusting piston which is arranged displaceably in the cylinder in such a way that the pressure space is present between the piston and the adjusting piston.

The invention therefore also relates to a brake cylinder described above, in which the cylinder comprises a section having an internal thread into which the adjusting piston is screwed by means of an external thread.

The invention therefore also relates to a brake cylinder described above, in which the adjusting piston has a hexagon socket in order to rotate the adjusting piston for adjustment in the cylinder.

The invention therefore also relates to a brake cylinder described above, in which the adjusting piston and the piston are connected to one another by means of a spring arrangement.

The invention therefore also relates to a brake cylinder described above, in which the distance between the inflow for hydraulic fluid into the pressure space and the adjusting piston in a position furthest away from the inflow is greater than the maximum possible adjustment distance of the adjusting piston.

The invention therefore also relates to a brake cylinder described above, in which the adjusting piston has a securing ring for limiting the adjustment distance.

The invention therefore also relates to a brake cylinder described above, in which the adjusting piston is sealed from the pressure space by means of a seal and the piston is sealed from the pressure space by means of a seal.

The invention therefore also relates to a brake cylinder described above, in which the piston is adjustable in length.

The invention therefore also relates to a brake cylinder described above, in which the piston comprises a part arranged nonrotatably with the adjusting means and a part arranged essentially nonrotatably with the cylinder.

The invention therefore also relates to a brake cylinder described above, in which the piston comprises a piston inner part and a piston outer part which are arranged rotatably relative to one another via a thread, and in which the adjusting device has an adjusting wheel which is connected nonrotatably with the piston inner part, the piston outer part being arranged in the cylinder essentially nonrotatably relative to the cylinder.

The invention therefore also relates to a brake cylinder described above, in which the adjusting wheel is preferably connected by means of a press fit nonrotatably with a bolt, the bolt having a noncircular head which engages an orifice of the piston inner part, which preferably has a cross-section corresponding to the cross-section of the head, in such a way that a nonrotatable connection between the adjusting wheel and the piston inner part is produced.

The invention therefore also relates to a brake cylinder described above, in which the piston outer part is a fastening head for receiving a brake pad, which fastening head is arranged essentially nonrotatably relative to the cylinder, the fastening head having a surface for preventing rotation of the piston outer part relative to the pad.

The invention therefore also relates to a brake cylinder described above, in which the brake pad is arranged in end regions between extensions of the cylinder.

The invention therefore also relates to a brake cylinder described above, in which the piston is arranged so as to be displaceable in the axial direction of the cylinder against the force of a spring.

The invention therefore also relates to a brake cylinder described above, in which the piston has a cavity which receives a bolt which is firmly connected in the axial direction to the adjusting device, the spring end adjacent to the pressure space being supported on the piston and the other end of said spring being supported on a head of the bolt.

The invention therefore also relates to a brake cylinder described above, in which the spring is axially supported on the piston by means of a washer.

The invention therefore also relates to a hydraulic rim brake comprising at least one and preferably two of the brake cylinders described above.

What is claimed is:

1. A brake cylinder for a hydraulic brake, comprising:
   a cylinder;
   a piston arranged displaceably in the axial direction of the cylinder;
   a pressure space, the piston being displaceable in the cylinder by changing the volume of the pressure space; and
   an adjusting device that adjusts the relative position of a free end of the piston in the axial direction with respect to the cylinder in such a way that the volume of the pressure space remains essentially unchanged.

2. The brake cylinder as claimed in claim 1, wherein the piston and the pressure space are displaced in the axial direction in the cylinder by the adjusting device.

3. The brake cylinder as claimed in claim 1, wherein the piston is adjustable in length.

4. A rim brake for bicycles, comprising at least one brake cylinder as claimed in claim 1.

5. The rim brake as claimed in claim 4, wherein the at least one brake cylinder is arranged in front of or behind the frame part, when viewed in a running direction of the rim.

6. The rim brake as claimed in claim 5, wherein two brake cylinders are rotatably arranged on respective frame parts.

7. The rim brake as claimed in claim 5, wherein an axis of rotation, viewed in the running direction of the rim, is arranged between the frame part and the brake cylinder.

8. The rim brake as claimed in claim 4, wherein, in a braking position, the at least one brake cylinder is held in an interlocking manner by at least one associated arrangement member.

9. The rim brake as claimed in claim 4, wherein the at least one brake cylinder is rotatable from a mounting position into a braking position.

* * * * *